United States Patent

Edwards et al.

[11] Patent Number: 6,156,417
[45] Date of Patent: Dec. 5, 2000

[54] LAMINATED GLAZINGS

[75] Inventors: Christopher Michael Edwards, Buxton, United Kingdom; Edward Louis d'Hooghe, Hulst, Netherlands

[73] Assignee: The Dow Chemical Company, Midland, Mich.

[21] Appl. No.: 09/227,651

[22] Filed: Jan. 8, 1999

Related U.S. Application Data

[60] Provisional application No. 60/073,811, Feb. 5, 1998.

[51] Int. Cl.⁷ ...................................................... B32B 17/10
[52] U.S. Cl. .................. 428/215; 428/423.3; 428/425.6; 428/213; 428/214
[58] Field of Search ............................... 428/423.3, 425.6, 428/213, 214, 215

[56] References Cited

U.S. PATENT DOCUMENTS

| | | | |
|---|---|---|---|
| 3,522,142 | 7/1970 | Wimser et al. | 161/90 |
| 4,166,149 | 8/1979 | Müller et al. | 428/339 |
| 4,623,592 | 11/1986 | Daudé et al. | 428/423.3 |
| 4,732,725 | 3/1988 | Moncheaux et al. | 264/255 |
| 4,857,407 | 8/1989 | Coleman et al. | 428/412 |
| 5,574,092 | 11/1996 | Oriani et al. | 524/590 |
| 5,627,254 | 5/1997 | Oriani | 528/76 |

FOREIGN PATENT DOCUMENTS

| | | |
|---|---|---|
| 0 295 596 | 12/1988 | European Pat. Off. . |
| 2 624 428 | 6/1989 | France . |
| 3-281659 | 12/1991 | Japan . |
| 98/50228 | 11/1998 | WIPO . |

*Primary Examiner*—D. S. Nakarani
*Assistant Examiner*—Christopher Pavlraj
*Attorney, Agent, or Firm*—Reid S. Willis

[57] ABSTRACT

The present invention is a laminated glazing comprising a rigid thermoplastic polyurethane sheet or film sandwiched between and adhering to an outer glass sheet and an inner glass sheet. This glazing can be made to be sufficiently thin to make it particularly suitable for intrusion-resistant automotive applications.

16 Claims, No Drawings

LAMINATED GLAZINGS

CROSS REFERENCE STATEMENT

This application claims the benefit of U.S. Provisional Application No. 60/073,811, filed Feb. 5, 1998.

BACKGROUND OF THE INVENTION

This invention relates to glazings, and in particular to laminated glazings having high intrusion resistance.

Glazings for automotive use comprise safety glass which may be laminated (widely used for windscreens) or toughened (widely used for sidelights). Each type of glazing provides some degree of impact resistance, but laminated glazings have certain advantages over toughened glass. Although laminated glazings are more expensive to manufacture than toughened glass, it would be desirable for all automotive glazings to be laminated to give improved intrusion resistance and to improve occupant retention in collisions.

Laminated glazings are generally prepared by adhering an impact-resistant layer between two pieces of glass. To be most effective, this impact-resistant layer must be rigid and resistant to penetration from blunt or sharp instruments such as crowbars, hammers, pick axes, and the like. Moreover, the impact-resistant layer, in combination with the glass plies, must be sufficiently thin and light-weight to be suitable for automotive applications. In an example of a conventional impact-resistant laminated glazing, a 3-mm thickness layer of polycarbonate is laminated between two 2-mm thick glass plies through a 0.76-mm thick adhesive interlayer to make a laminate that is more than 8 mm thick. Unfortunately, this laminate, to be effective, is too thick for many automotive glazing specifications, which require a total thickness of less than about 5 mm.

In view of the deficiencies in the art of intrusion-resistant glazings, it would be advantageous to find a more suitable impact resistant layer that meets all of the

SUMMARY OF THE INVENTION

The present invention addresses the shortcomings of impact-resistant materials for automotive anti-intrusion applications. In one aspect, the present invention is an intrusion-resistant laminated glazing comprising a rigid thermoplastic polyurethane sheet adhering to and sandwiched between an outer glass sheet and an inner glass sheet. Because of the inherent toughness and rigidity of thermoplastic polyurethanes, relatively thin polyurethane sheets, for example, about 0.2 to about 1.5 mm thick, may be used, so that the laminate structure of the present invention is suitable for automotive use without the disadvantages of thickness and weight referred to above.

DETAILED DESCRIPTION OF THE INVENTION

The present invention is a laminated glazing comprising a rigid thermoplastic polyurethane impact resistant sheet adhering to and sandwiched between an outer glass sheet and an inner glass sheet. The laminated glazing is suitable as a protective window for any glazing application, and is particularly suitable for automotive use, where especially thin glazings are critical. As used herein, the term "outer glass sheet" refers to the glass sheet that is exposed to the outside of the automobile or building, for example; similarly, the term "inner glass sheet" refers to the glass sheet that is exposed to the inside of the automobile or building.

Rigid thermoplastic polyurethanes have a glass transition temperature of at least 50° C., and contain units formed from the reaction of a polyisocyanate, a difunctional chain extender, and optionally, a high molecular weight polyol. Hard segments are structural units formed from the reaction of the polyisocyanate and the difunctional chain extender, and soft segments are structural units formed from the reaction of the high molecular weight polyol and the polyisocyanate. Preferably, the hard segment constitutes not less than about 75, and more preferably not less than about 90 weight percent of the rigid thermoplastic polyurethane, and as much as about 100 percent of the rigid thermoplastic polyurethane. Preferably, the rigid thermoplastic polyurethane has a flex modulus of not less than about 0.5 GPa, more preferably not less than about 1.0 GPa.

The polyisocyanate is preferably a diisocyanate, which may be aromatic, aliphatic, or cycloaliphatic. Representative examples of these preferred diisocyanates can be found in U.S. Pat. Nos. 4,385,133, 4,522,975, and 5,167,899, the disclosure of which diisocyanates are incorporated herein by reference. Preferred diisocyanates include 4,4'-diisocyanatodiphenylmethane, p-phenylene diisocyanate, 1,3-bis(isocyanatomethyl)-cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicyclohexylmethane, and 2,4-toluene diisocyanate, or mixtures thereof. More preferred are 4,4'-diisocyanatodicyclohexylmethane and 4,4'-diisocyanatodiphenylmethane.

As used herein the term "difunctional chain extender" refers to a low molecular diol having a molecular weight of not greater than 200. Preferred chain extenders include ethylene glycol, 1,3-propanediol, 1,4-butanediol, 1,5-pentanediol, 1,6-hexanediol, diethylene glycol, triethylene glycol, tetraethylene glycol, neopental glycol, 1,4-cyclohexanediemethanol, 1,4-bishydroxyethylhydroquinone, and combinations thereof. Particularly preferred difunctional chain extenders include 1,6-hexanediol and mixtures of 1,4-butane diol and diethylene glycol, 1,4-butane diol and triethylene glycol, and 1,4-butane diol and tetraethylene glycol.

The term "high molecular weight polyol" is used herein to refer to a diol having a molecular weight not less than about 500 amu, preferably not less than about 600 amu, more preferably not less than about 1000 amu, and preferably not more than about 6000 amu, more preferably not more than about 3000 amu, and most preferably not more than about 2000 amu. For the purposes of the present invention, it is especially desirable to prepare an optically clear thermoplastic polyurethane. Thus, it is either preferred to exclude the high molecular weight polyol, or to incorporate a high molecular weight polyol or a combination of high molecular weight polyols that form a single phase with the difunctional chain extender in the rigid thermoplastic polyurethane.

Examples of high molecular weight diols that can be used to form optically clear rigid thermoplastic polyurethanes include polyether glycols such as polypropylene glycol, polyethylene glycol, and polytetramethylene glycol; and polyester glycols such as polycaprolactone glycol, as well as compounds that can be prepared from the condensation reaction of an aliphatic diacid, diester, or di(acid chloride) with a $C_2$–$C_8$ linear, branched, or cyclic diol, or ether containing diol, or blends thereof. More preferred high molecular weight polyester glycols useful for forming optically transparent rigid thermoplastic polyurethanes include polycaprolactone glycol, polyethylene adipate glycol, and polybutylene adipate glycol.

The rigid thermoplastic polyurethane of the present invention is advantageously prepared in the presence of a suitable catalyst such as those disclosed in U.S. Pat. No. 5,001,265, column 5, line 46 to column 6, line 5, which disclosure is incorporated herein by reference. Preferred catalysts include stannous octoate, stannous oleate, dibutyltin dioctoate, and dibutyltin dilaurate. The amount of catalyst used is sufficient to increase the reactivity of an isocyanate group with an OH group without undesirably affecting the properties of the final product, and is preferably in the range of about 0.02 to about 2.0 weight percent based on the total weight of the reactants.

The isocyanate-to-OH ratio of the reactants varies from about 0.95:1, preferably from about 0.975:1, and more preferably from about 0.985:1, to about 1.05:1, preferably to about 1.025:1, and more preferably to about 1.015:1.

Rigid thermoplastic polyurethanes can be suitably prepared by batch or continuous processes such as those known in the art. A preferred continuous mixing process is reactive extrusion, such as the twin-screw extrusion process disclosed in U.S. Pat. No. 3,642,964, the description of which process is incorporated herein by reference. Examples of preferred thermoplastic polyurethane materials are optically clear ISOPLAST™ polyurethane engineering thermoplastic resins (a trademark of The Dow Chemical Company).

The thickness of the rigid thermoplastic polyurethane layer is application dependent. For automotive glazing applications, the thickness is generally not less than about 0.2 mm, preferably not less than about 0.5 mm, and not more than about 3 mm, more preferably not more than about 2 mm, and most preferably not more than about 1.5 mm.

The rigid thermoplastic polyurethane is preferably bonded to the glass layers in an autoclave in the presence or absence of ancillary solvents. The rigid thermoplastic polyurethane can be modified with siloxane functionality to render it compatible with the glass, and the siloxane-containing dihydroxy groups can be reacted with the diisocyanate groups to form a rigid thermoplastic polyurethane that contains siloxane functionality in the backbone of the polymer. Alternatively, a siloxane can be non-reactively blended with the monomers used to form the rigid thermoplastic polyurethane.

The rigid thermoplastic polyurethane may be bonded to the glass using low modulus adhesive layers (for example, less than 100 Mpa, preferably less than 10 Mpa) between the high modulus glass and the high modulus rigid polyurethane. For example, a soft thermoplastic polyurethane, which has $T_g$ of less than 25° C. and preferably contains greater than 25 percent by weight soft segment, can be used as an adhesive layer to prevent cracks propagating through the outer glass ply and into the rigid interlayer. An example of a commercially available soft thermoplastic polyurethane suitable for use as an adhesive layer is a PELLETHANE™ polyurethane elastoplastic polymer (a trademark of The Dow Chemical Company). The adhesive is preferably not less than about 10 microns thick, more preferably not less than about 25 microns thick, and most preferably not less than about 50 microns thick; and preferably not greater than about 500 microns thick, more preferably not greater than about 400 microns thick, and most preferably not greater than about 200 microns thick.

It may be advantageous to use a soft thermoplastic polyurethane that is prepared from an aliphatic or cycloaliphatic diisocyanate, or a combination thereof, as well as a high molecular weight diol or combination of high molecular weight diols suitable for the formation of an optically clear resin. The class of high molecular weight diols suitable for forming optically clear soft thermoplastic polyurethanes is the same as the class for forming optically clear rigid thermoplastic polyurethanes.

The thickness of the glass layers and the laminate itself is application dependent. For automotive glazing applications, the thickness of each of the glass layers for automotive is preferably not less than about 0.5 mm, more preferably not less than about 0.7 mm, and most preferably not less than about 1.5 mm; and preferably not greater than about 4 mm, more preferably not greater than about 3 mm, and most preferably not greater than about 2 mm. The thickness of the laminate for automotive glazing applications is preferably not greater than about 10 mm, more preferably not greater than about 7 mm, and most preferably not greater than 6 mm.

The reduced thickness of the laminates of the present invention (as compared to the prior art laminates incorporating polycarbonate) save on weight and materials; moreover, these laminated glazings of reduced thickness can be fitted into openings (especially openings in motor vehicles) designed to be glazed with conventional nominal 4- or 5-mm glazings.

Inasmuch as certain thermoplastic polyurethanes, particularly those prepared using aromatic diisocyanates, may yellow as a result of exposure to UV radiation, it may be desirable to use, at least for the outer glass layer, but preferably for both glass layers, a glass that absorbs UV light or that is incorporated with a UV-absorptive material, such as oxides of iron, preferably $Fe_2O_3$. Glass containing such UV-absorptive materials is well known and commercially available. A UV-absorptive material may be incorporated into the adhesive layer that bonds the rigid thermoplastic polyurethane to the outer glass layer to prevent discoloration of the rigid thermoplastic polyurethane. Moreover, UV-absorptive material can be incorporated in the glass and adhesive layers. On the other hand, if the thermoplastic polyurethane is prepared with an aliphatic or a cycloaliphatic diisocyanate such as 4,4'-diisocyanatodicyclohexylmethane, discoloration is less likely to occur, and a UV-absorptive glass may be unnecessary.

What is claimed is:

1. An intrusion-resistant laminated glazing comprising a rigid thermoplastic polyurethane sheet adhering to and sandwiched between an outer glass sheet and an inner glass sheet, wherein the rigid thermoplastic polyurethane sheet has a glass transition temperature of at least 50° C. and a flex modulus of not less than about 1.0 GPa.

2. The laminated glazing of claim 1 wherein the rigid thermoplastic polyurethane has a hard segment that constitutes not less than about 90 weight percent of the rigid thermoplastic polyurethane, based on the weight of the rigid thermoplastic polyurethane.

3. The laminated glazing of claim 2 wherein the hard segment constitutes about 100 weight percent of the rigid thermoplastic polyurethane.

4. The laminated glazing of claim 2 wherein the rigid thermoplastic polyurethane contains a soft segment formed from a polypropylene glycol, a polyethylene glycol, a polytetramethylene glycol, a polyethylene adipate glycol, a polybutylene adipate glycol, a polycaprolactone glycol, or a combination thereof.

5. The laminated glazing of claim 2 wherein the rigid thermoplastic polyurethane is prepared from an aliphatic or a cycloaliphatic diisocyanate, or a combination thereof.

6. The laminated glazing of claim 5 wherein the rigid thermoplastic polyurethane is prepared from 4,4'-diisocyanatodicyclohexylmethane.

7. The laminated glazing of claim 2 wherein the rigid thermoplastic polyurethane is prepared from an aromatic diisocyanate.

8. The laminated glazing of claim 7 wherein the aromatic diisocyanate is 4,4'-diisocyanatodiphenylmethane.

9. The laminated glazing of claim 1 wherein the rigid thermoplastic polyurethane contains a soft segment formed from a polyether glycol or polyester glycol.

10. The laminated glazing of claim 1 wherein the rigid thermoplastic polyurethane is bonded to the inner glass sheet and the outer glass sheet in the absence of an ancillary adhesive.

11. The laminated glazing of claim 1 wherein the rigid thermoplastic polyurethane is bonded to the glass sheets by an adhesive layer having a flex modulus of less than 100 Mpa.

12. The laminated glazing of claim 11 wherein the rigid thermoplastic polyurethane is bonded to the glass sheets by a soft thermoplastic polyurethane that has a $T_g$ of less than 25° C.

13. The laminated glazing of claim 11 wherein the adhesive layer contains a UV-absorbing material.

14. The laminated glazing of claim 1 wherein the thermoplastic polyurethane sheet has a thickness of not less than about 0.2 mm and not more than about 1.5 mm; and the outer and the inner glass layers each have a thickness of not less than about 0.7 mm and not greater than about 2 mm, with the proviso that the total thickness of the laminated glazing is less than about 6 mm.

15. An intrusion-resistant laminated glazing comprising a rigid thermoplastic polyurethane sheet sandwiched between two glass sheets and bonded to each glass sheet by an adhesive layer having a flex modulus of less than 100 MPa, wherein the thermoplastic polyurethane has a glass transition temperature of at least 50° C., a flex modulus of not less than about 1.0 GPa, and a hard segment that constitutes not less than 90 weight percent of the rigid thermoplastic polyurethane, based on the weight of the rigid thermoplastic polyurethane.

16. The intrusion-resistant laminated glazing of claim 15 wherein the adhesive layers contain a soft thermoplastic polyurethane have a $T_g$ of less than 25° C.

* * * * *